（12） United States Patent
Miao et al.

(10) Patent No.: US 9,253,771 B2
(45) Date of Patent: Feb. 2, 2016

(54) USER EQUIPMENT-DESIGNED DEMODULATION REFERENCE SIGNAL PATTERN BOOK

(71) Applicants: Honglei Miao, Nuremberg (DE);
Biljana Badic, Düsseldorf (DE);
Rajarajan Balraj, Nuremberg (DE)

(72) Inventors: Honglei Miao, Nuremberg (DE);
Biljana Badic, Düsseldorf (DE);
Rajarajan Balraj, Nuremberg (DE)

(73) Assignee: Intel IP Corporation, Santa Clara, CA (US)

( * ) Notice: Subject to any disclaimer, the term of this patent is extended or adjusted under 35 U.S.C. 154(b) by 126 days.

(21) Appl. No.: 14/229,573

(22) Filed: Mar. 28, 2014

(65) Prior Publication Data

US 2015/0282124 A1 Oct. 1, 2015

(51) Int. Cl.
*H04W 72/00* (2009.01)
*H04W 72/04* (2009.01)
*H04L 5/00* (2006.01)
*H04W 72/08* (2009.01)

(52) U.S. Cl.
CPC ........... *H04W 72/042* (2013.01); *H04L 5/0035* (2013.01); *H04W 72/082* (2013.01)

(58) Field of Classification Search
CPC . H04W 72/042; H04W 72/082; H04L 5/0035
See application file for complete search history.

(56) References Cited

U.S. PATENT DOCUMENTS

| 2010/0080154 A1* | 4/2010 | Noh ..................... H04B 7/0452 370/310 |
| 2011/0268102 A1* | 11/2011 | Zhu ......................... H04L 5/003 370/345 |
| 2014/0128115 A1* | 5/2014 | Siomina ................ H04L 1/0015 455/501 |
| 2015/0098440 A1* | 4/2015 | Yang .................... H04J 11/0056 370/330 |

FOREIGN PATENT DOCUMENTS

KR 1020110135395 A 12/2011
WO 2013119073 8/2013

OTHER PUBLICATIONS

3GPP TS 36.101, "Evolved Universal Terrestrial Radio Access (E-UTRA); User Equipment (UE) radio transmission and reception (Release 10)", V10.3.0, Jun. 2011, 236 pages.
3GPP TS 36.211, "Evolved Universal Terrestrial Radio Access (E-UTRA); Physical channels and modulation (Release 10)", V10. 0.0, Jan. 2011, 105 pages.
Broadcom Corporation, "Adaptive UE Specific Reference Signal Design", R1-131321, 3GPP TSG RAN WG1 Meeting #72bis, Chicago, United States, Apr. 15-19, 2013, 4 pages.
Ericsson, "Considerations on RS Design for LTE-Advanced", R1-090916, 3GPP TSG-RAN WG1 #56, Athens, Greece, Feb. 9-13, 2009, 3 pages.
Intel Corporation, "Configuration and Signaling for UE-specific PUSCH DM-RS", R1-122635, 3GPP TSG-RAN WG1 Meeting #69, Prague, Czech Republic, May 21-25, 2012, 5 pages.
PCT/US2015/017782, International Search Report and Written Opinion, Jun. 16, 2015, 13 pages.

* cited by examiner

*Primary Examiner* — Kashif Siddiqui
(74) *Attorney, Agent, or Firm* — Stoel Rives LLP

(57) ABSTRACT

A user equipment (UE) is capable of dynamically designing and signaling to an evolved node b (eNB) a demodulation reference signal (DMRS) pattern book defining a set of DMRS patterns associated with a downlink channel of a long term evolution (LTE) wireless network.

26 Claims, 5 Drawing Sheets

USER EQUIPMENT-DESIGNED DEMODULATION REFERENCE SIGNAL PATTERN BOOK

TECHNICAL FIELD

The present disclosure relates generally to a long term evolution (LTE) wireless network demodulation reference signal (DMRS) provided by an evolved universal mobile telecommunications system terrestrial radio access network node b (also known as an evolved node b, or simply eNB) to a user equipment device (also known as a UE device, or simply UE) for downlink channel estimation at the UE, and, more particularly, to a set of DMRS patterns.

BACKGROUND INFORMATION

Channel estimation is a process by which a received wireless signal is adjusted by compensating for signal distortion caused by wireless channel fading. For example, fading causes signal strength to fluctuate rapidly due to multipath-time delay in a wireless communication system environment. Accordingly, to determine how the signal has been distorted, a reference signal known to both a transmitter and a receiver is transmitted through the channel so that the receiver can determine and compensate for wireless channel conditions affecting the reference signal.

A reference signal in an LTE wireless network is a signal having characteristics known to both a mobile station (e.g., a UE) and a base station (e.g., an eNB). Uplink reference signals are those that are produced by the UE for reception at the eNB. Downlink reference signals are those that are produced by the eNB for reception at the UE. Examples of downlink reference signals, explained in the following paragraphs, include a cell-specific reference signal (CRS), a UE-specific reference signal (DMRS), and a channel state information reference signal (CSI-RS).

In LTE release version no. 8 (LTE Rel-8) systems, many wireless communications facilities employ CRSs. For example, the following LTE components all use CRS-based channel information: physical downlink shared channel (PDSCH) demodulation, reference signal received power (RSRP) and reference signal received quality (RSRQ) (RSRP/RSRQ) measurements ranking candidate cells for handover and cell reselection decision, channel quality indicator (CQI) feedback, pre-coding matrix indicator (PMI) feedback, rank indication (RI) feedback, and other parameters.

In the LTE release version no. 10 (LTE Rel-10) standard, the fundamentally CRS-centric system was complemented by a UE-centric reference signal system. The UE-centric reference signals include DMRSs and CSI-RSs that a UE uses to acquire channel state information. These UE-centric reference signals fulfill a number of design goals, including reducing the reference signal overhead, providing interference measurability, reducing reference signal interference for coordinated multi-point (CoMP) transmission/reception (e.g., CoMP scenario 4 characterized by one common cell-ID shared among multiple cells), and other goals. Developing standard sets of pre-defined reference signals to address numerous channel and device deployment scenarios, however, is an ongoing challenge.

DETAILED DESCRIPTION OF EMBODIMENTS

Figure 1:
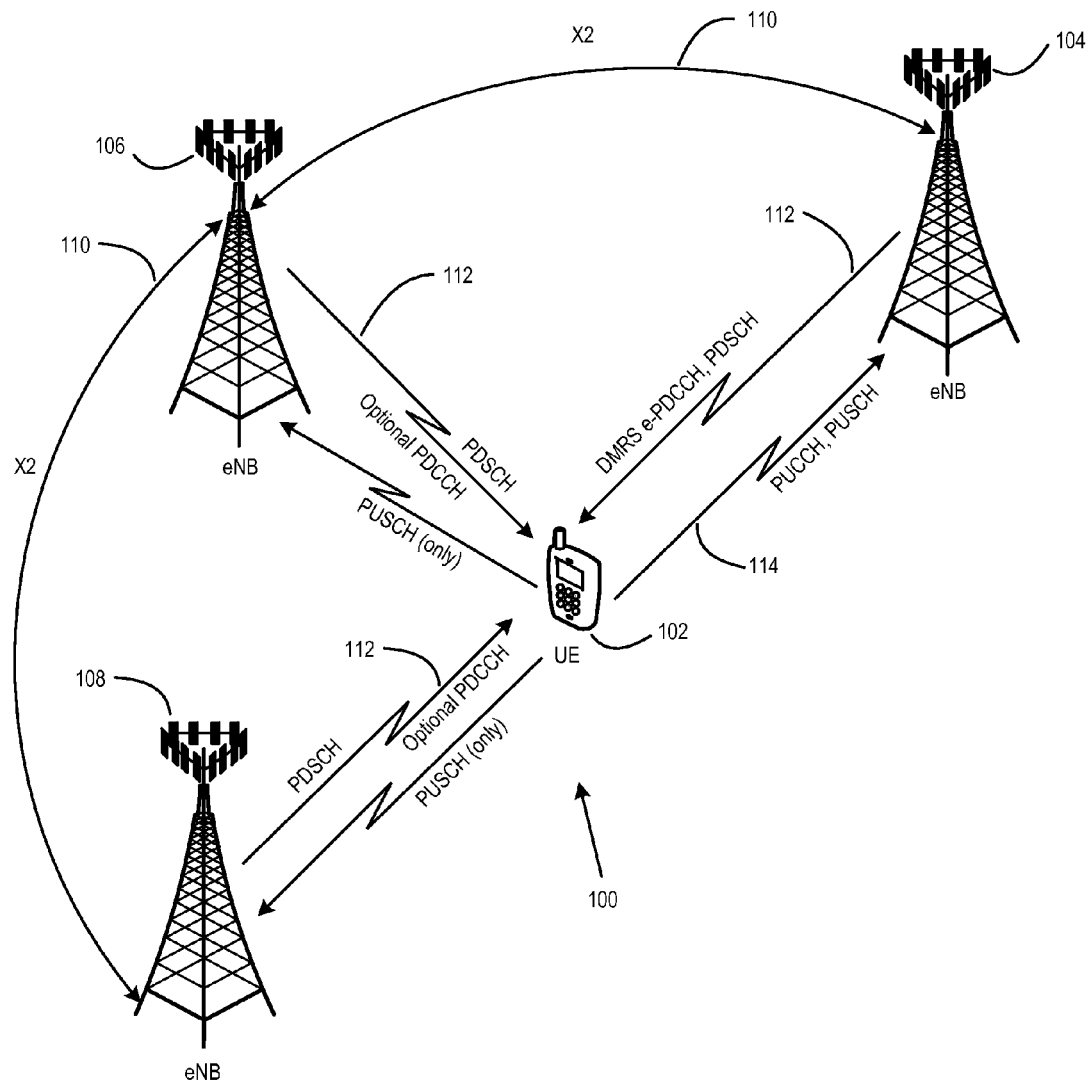
FIG. 1 is a block diagram of a wireless network in accordance with some embodiments.

The Third-Generation Partnership Project™ (3GPP) Technical Specifications Group (TSG) Radio Access Network (RAN) Working Group 1 (WG1) has determined objectives for a small cell enhancement (SCE) study item. One objective includes studying potential enhancements to improve the spectrum efficiency, i.e., improving maximum user throughput in typical coverage situations and with typical terminal configurations, for small cell deployments. Accordingly, some potential enhancements noted for further study include: introduction of a higher order modulation scheme, e.g., 256 quadrature amplitude modulation (QAM), for the LTE wireless network downlink channel; and further overhead reduction for LTE reference signals, control signals, and feedback in downlink and uplink channels based on existing channel and signal standards.

Motivated by the aforementioned objectives and potential enhancements, several attempts for reducing DMRS overhead have been proposed. Such proposals have included placing DMRS in new resource element (RE) locations of a physical resource block (PRB), thereby defining new standardized DMRS placement patterns (so-called DMRS patterns). New DMRS patterns would be selected to reduce the training sequence overhead associated with the LTE Rel-10 standard DMRS patterns. In addition, an adaptive DMRS transmission scheme has been proposed by Broadcom Corporation in RAN1-72bis, titled "Adaptive UE Specific Reference Signal Design." In this proposal, a set of DMRS patterns is specified in the standard, and the transmission of a particular DMRS pattern in the defined set can be semi-statically or dynamically signaled to the UE based on a modulation scheme or deployment scenario. Such proposed methods would still entail development of new DMRS patterns specified in the RAN1 specification, 3GPP TS 36.211, "LTE; Evolved Universal Terrestrial Radio Access (E-UTRA); Physical Channels and Modulation." Associated testing procedures for the new DMRS patterns would then be added into the related specification, 3GPP TS 36.101, "LTE; Evolved Universal Terrestrial Radio Access (E-UTRA); User Equipment (UE) radio transmission and reception." These tasks would inevitably lead to an extensive standards development process and drafting effort.

Trade-offs between reference and data signals are typically contingent upon channel and hardware conditions, i.e., channel coherence time/frequency, signal to noise ratio (SNR) at a receiver, and channel estimator device accuracy and performance of the UE. For example, a DMRS pattern—i.e., the DMRS location in time/frequency RE orthogonal frequency division multiple access (OFDMA) grid of a PRB for a particular downlink subframe configuration (antenna number, cyclic prefix, subframe configuration, or other parameters)—could be optimized according to various types of UE. Even among UE of the same or similar type, frequency selectivity may vary in different parts of the system bandwidth. For instance, in some parts of the bandwidth, a channel exhibits approximately flat fading, whereas in the other parts of the bandwidth, frequency-selective fading is more prominent. In such cases, a UE could select DMRS patterns based on certain frequency resource allocations.

Specification in LTE standards of pre-defined DMRS patterns optimized for various channel and hardware conditions would be an extensive undertaking. Accordingly, the present disclosure describes techniques allowing a UE to design, and thereby dynamically define, its own DMRS pattern book based on a UE's perception of channel conditions, SNR at the receiver, and its channel estimator performance. These resulting patterns are dynamic because they need not be pre-defined (i.e., hardcoded) according to a standard implemented by the eNB and UE. Additional techniques enable a UE to design and signal the DMRS pattern book to an eNB, which uses the UE-designed DMRS pattern book to select a DMRS pattern.

Several benefits of a dynamically UE-designed DMRS pattern book are as follows. First, it enables different UE to have different DMRS pattern books tailored to accommodate the respective channel conditions of the different UE. Therefore, the spectrum efficiency is individually optimized for each one of the different UE. For example, when a UE is experiencing a very frequency-flat channel (a channel that varies slowly in the frequency domain), a UE-designed DMRS pattern can have very low DMRS density in the frequency direction, e.g., half of the current density of 24 resource elements per resource block. And when a UE is approximately stationary so that the channel is not varying significantly in time, the DMRS can be placed very sparsely in the time domain. Accordingly, in transmission time interval (TTI) bundling or semi-persistent scheduling (SPS) cases where transmission of a data packet spans a number of consecutive subframes, the DMRS can be designed for several consecutive subframes. In other words, the DMRS will not reoccur for at least several subframes, and the number of subframes is defined in the UE-designed DMRS pattern. Second, rather than being constrained to current Rel-10 types of DMRS patterns, the UE-designed DMRS pattern book is signaled to the eNB, thereby allowing the eNB to have additional flexibility in selecting a DMRS pattern. Third, a UE can further design and signal a frequency-dependent DMRS pattern book, which is designed for the entire available bandwidth or a portion of the bandwidth. Fourth, in addition to the above performance benefits, a dynamically UE-designed DMRS pattern book also reduces the technical standard drafting effort expended to specify new DMRS patterns in a RAN1 specification.

Aspects and advantages will be apparent from the following detailed description of embodiments, which proceeds with reference to the accompanying drawings. Initially, the description of FIG. 1 provides an overview of a wireless network including a UE designing, and signaling to an eNB, a DMRS pattern book. Design of the UE-designed DMRS pattern book is described with reference to FIG. 2, and an example of the UE-designed DMRS pattern book is described with reference to FIG. 3. After the calculation of the UE-designed DMRS pattern book, the UE may start the signaling procedure illustrated in FIG. 4 to communicate the designed DMRS pattern book to the eNB. An example UE is shown and described with reference to FIG. 5.

A. LTE Wireless Network Example

FIG. 1 illustrates a wireless network in accordance with some embodiments. A wireless network 100 includes a UE 102 (see also, FIG. 5) and a plurality of eNBs 104, 106, and 108 providing communication services to UE, such as UE 102. In some embodiments, eNBs 104, 106, and 108 may communicate with one another over an X2 interface 110. Each eNB 104, 106, and 108 may be associated with a set of one or more serving cells that may include macrocells and smallcells.

Serving cells (PCells and SCells) may be operated on one or more eNBs. For example, a PCell is served from a macrocell of eNB 104, an SCell is served from a smallcell of eNB 106, and those serving cells communicate through the X2 interface 110. Typically, a PCell is configured with one physical downlink control channel (PDCCH) and one physical uplink control channel (PUCCH). It could also have a physical downlink shared channel (PDSCH) or a physical uplink shared channel (PUSCH). An SCell could be configured with those shared channels and a PDCCH, but usually no PUCCH in conventional LTE. In some embodiments, a downlink channel 112 may include a PDSCH and PDCCH. In some embodiments, an uplink channel 114 may include a PUSCH or PUCCH.

B. Example of a UE Designing a DMRS Pattern Book

Figure 2:
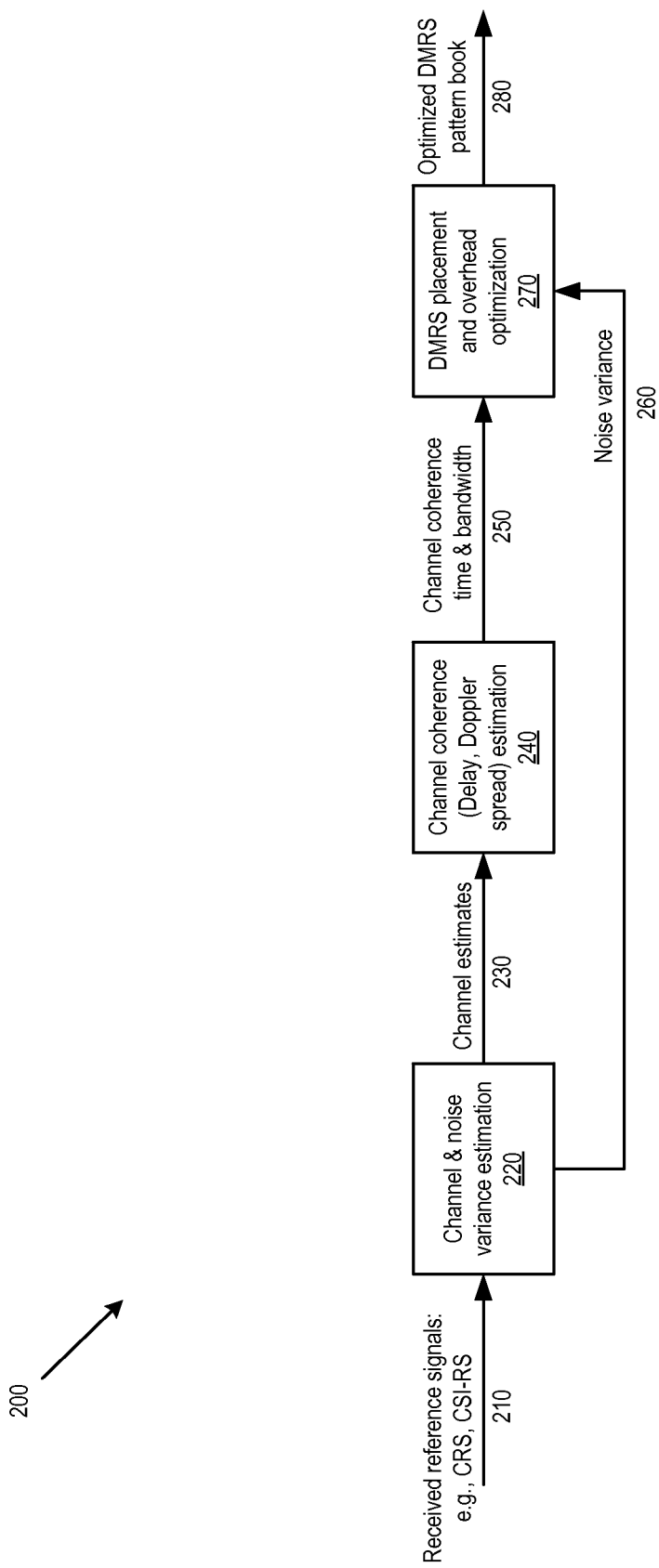
FIG. 2 is a flow diagram showing a method of designing an optimized set of ad hoc UE-designed DMRS patterns (a so-called DMRS pattern book).

An optimized DMRS pattern book can be designed by the UE 102 using the example method 200 illustrated in FIG. 2. Upon receiving 210 CRSs and/or CSI-RSs, the UE 102 performs channel and noise variance estimation 220 based on information obtained from the CRSs and/or CSI-RSs to obtain channel estimates 230. Channel estimates 230 are further processed during channel coherence estimation 240, which uses estimates of multipath-time delay spread and Doppler spread (so-called delay and Doppler spreads) to derive channel coherence time and coherence bandwidth 250. The channel coherence time and bandwidth 250, along with noise variance estimates 260, are then used for DMRS optimization 270, which outputs an optimized DMRS pattern book 280. The book 280 includes DMRS patterns representing an optimum trade-off between DMRS overhead and the resulting mean square error of channel estimates 230. In other words, an optimum DMRS pattern is a function of channel coherence time, coherence bandwidth, and the noise variance. For a frequency-selective fading channel, different bandwidth parts of the channel may have different coherence time and bandwidth, such that optimum DMRS patterns vary for different regions of the bandwidth spectrum. Hence, a UE may produce different DMRS patterns for different parts of the whole system bandwidth.

C. DMRS Pattern Book Example

Figure 3:
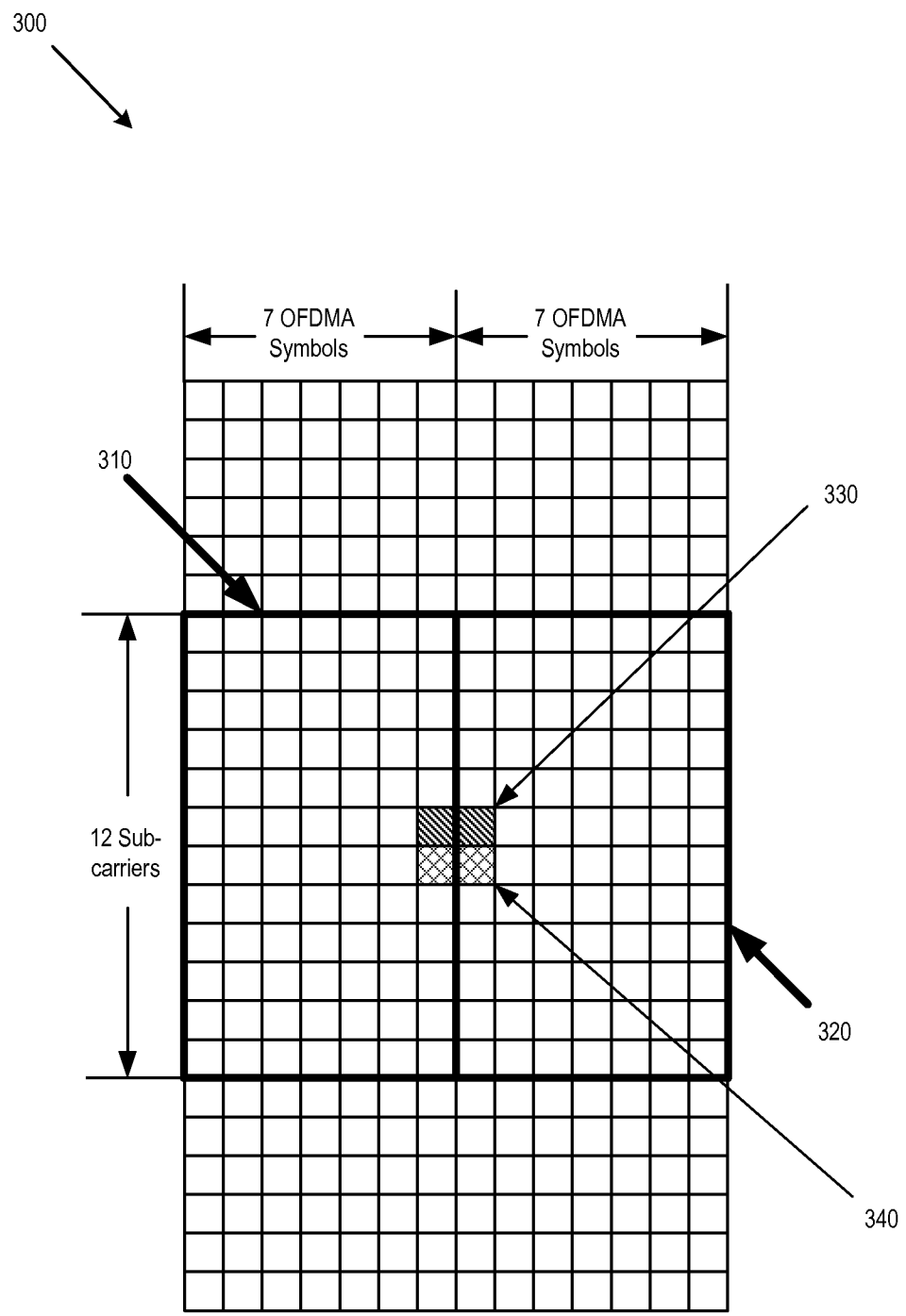
FIG. 3 is a block diagram of a physical resource block (PRB) showing an example DMRS pattern book.

FIG. 3 is an example DMRS pattern book 300 illustrated in the form of two consecutive PRBs 310 and 320. An RE pair 330, shown in hatching and spanning the two PRBs 310 and 320, is used for layers 1 and 2, antenna ports 7 and 8; and an RE pair 340, shown in crosshatching and also spanning the two PRBs 310 and 320, is used for layers 3 and 4, antenna ports 9 and 10. In this example, the UE 102 observed that channel frequency response is very flat between the two PRBs 310 and 320. Therefore, the UE 102 designed DMRS pattern book 300 to encompass the two PRBs 310 and 320, and to provide one RE pair (e.g., RE pair 330) that the UE 102 determined to be adequate for enabling the UE 102 to subsequently perform channel estimation for two consecutive PRBs.

Though FIG. 3 illustrates the concept of a DMRS pattern book by superimposing patterns onto two PRBs, according to another embodiment, each DMRS pattern book would include, for each of the DMRS patterns, information identifying RE indexes (e.g., OFDMA subcarrier and symbol locations) in one or more associated PRBs. For example, a DMRS pattern book may include OFDMA subcarrier and symbol locations, and it may include a periodicity of the pattern in frequency or time domain. In the frequency domain example, a DMRS pattern may repeat in every first, second, fourth, or other number of sequential PRBs. In the time domain example, a DMRS pattern may repeat in every subframe, second subframe, or other period of subframes.

D. Example of DMRS Pattern Book Signaling

Figure 4:
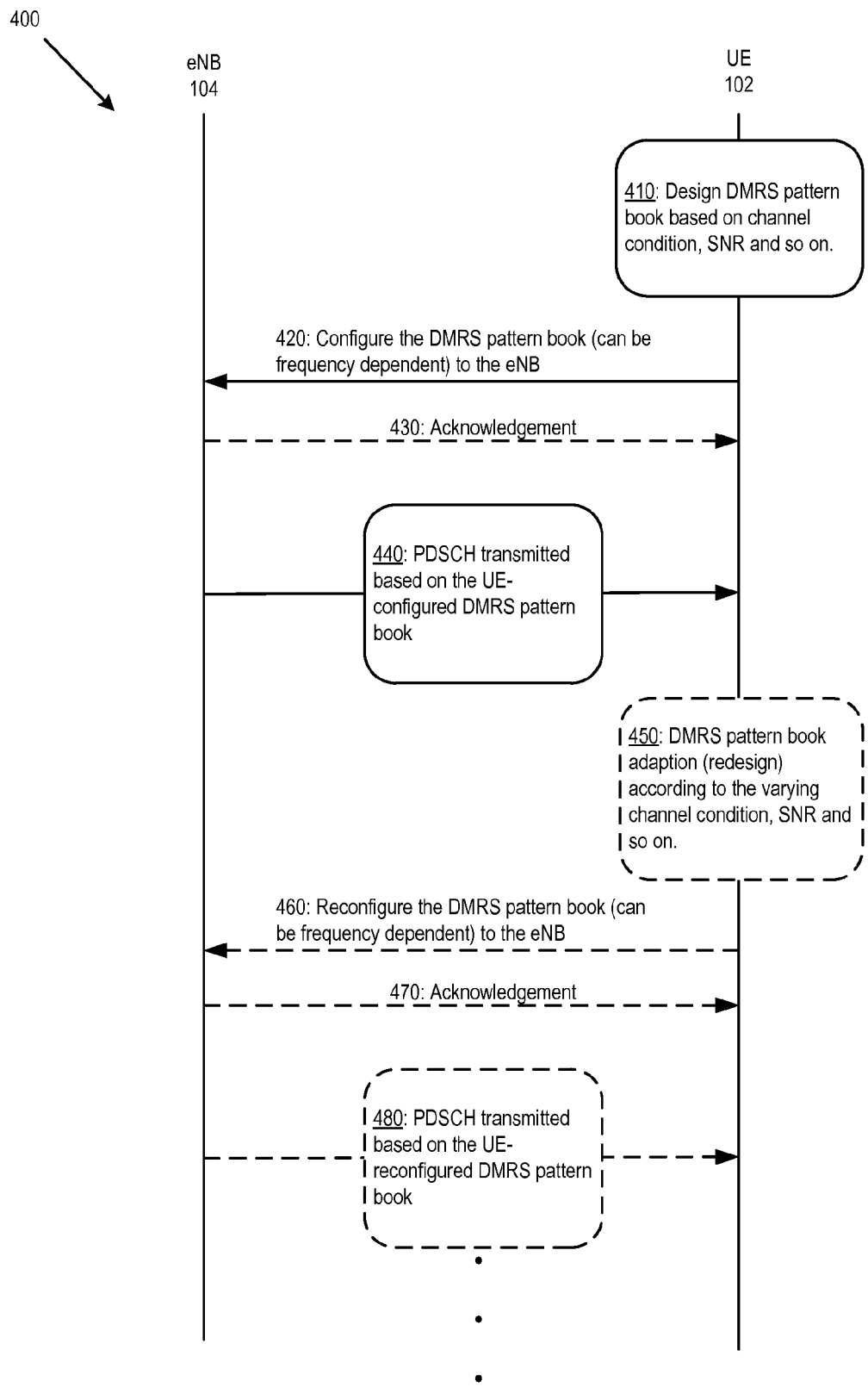
FIG. 4 is a message sequence chart showing message interactions for signaling a UE-designed DMRS pattern book between a UE and an eNB.

FIG. 4 is a signaling diagram 400 showing an example of the UE-designed DMRS pattern book design and signaling. First, at step 410, the UE 102 designs (FIG. 2) a DMRS pattern book 300 (FIG. 3). Second, the UE 102 provides 420 this DMRS pattern book 300 to the eNB 104. Many suitable signaling protocols are contemplated and within the scope of this description, and according to one embodiment, the DMRS pattern book 300 is signaled to the eNB 104 using radio resource control (RRC) signaling.

To implement the UE-designed DMRS pattern book signaling, new RRC signaling information would be added to the existing LTE RRC specification. For example, the RRC signaling to convey the DMRS pattern book 300 may include the following information: a total number of DMRS patterns in this pattern book 300, and information concerning the placement (e.g., distribution) of each DMRS pattern within a downlink slot. As noted in the previous section, this placement information may include: periodicity of the pattern in frequency domain (e.g., repeat pattern in every PRB, or every second PRB, every fourth PRB, and so on); periodicity of the pattern in time domain (e.g., repeat in every subframe, or every second subframe, and so on); and RE indexes of the DMRS in the PRBs associated with the pattern.

Next, the eNB 104 optionally acknowledges 430 reception of the DMRS pattern book 300. (Optional signaling steps are all shown in dashed lines.) After receiving the DMRS pattern book 300 signaled from the UE 102, the eNB 104 dynamically selects from the received DMRS pattern book 300 a DMRS pattern for a scheduled PDSCH transmission in a subframe at step 440. Then the eNB 104 uses the configured DMRS pattern for the PDSCH transmission.

When the channel conditions and/or SNR change at the UE side, the UE 102 can adapt or create a new DMRS pattern book at step 450, and reconfigure the DMRS pattern book by signaling it to the eNB 104 at step 460. The eNB 104 acknowledges 470 the updated DMRS pattern book, and transmits 480 a PDSCH transmission with a new DMRS pattern selected from the updated DMRS pattern book. When the channel conditions change again, the UE 102 may continue reconfiguring the DMRS pattern book and signaling it to the eNB 104, so that the eNB 104 can use reconfigured DMRS pattern books to select DMRSs for the PDSCH transmissions.

E. Example of an eNB Selecting and Responding to a UE-Designed DMRS Pattern for PDSCH Transmission from the eNB In some embodiments, upon receiving signaling indicating the DMRS pattern book designed by the UE 102, the eNB 104 immediately begins using a UE-designed DMRS pattern for the DMRS-based PDSCH transmission. In some other embodiments, however, the eNB 104 may optionally determine for a particular PDSCH transmission in a subframe whether to use a conventional DMRS pattern specified in a technical standard or a UE-designed DMRS pattern. The eNB 104, therefore, signals to the UE 102 the selected DMRS pattern used for the scheduled PDSCH in the current subframe. Two example signaling methods employed by the eNB 104 are as follows.

E.1 Semi-Static Signaling

The eNB 104 uses RRC signaling to inform the UE 102 which DMRS pattern is to be used for the subsequent PDSCH transmission. The signaled DMRS pattern can be a conventional DMRS pattern from a technical standard or one that was previously identified in a DMRS pattern book. The RRC signaling from the eNB 104 would be pre-defined in a technical standard, according to one embodiment.

E.2 Dynamic Signaling

In this example, the eNB 104 signals a selected DMRS pattern on a subframe basis for the PDSCH transmission scheduled in the current subframe. In other words, in every subframe that contains a data packet, downlink control information (which schedules the data packet) is transmitted in the PDCCH to indicate the selected DMRS pattern. This entails defining a numbering system (i.e., indexing, or other logical order) for DMRS patterns so that the eNB 104 can indicate an index value that corresponds to a selected DMRS pattern. Based on such a numbering system, the eNB 104 can signal which particular DMRS pattern is used for the current PDSCH transmission. The relationship between the index values and the DMRS patterns in a UE-designed DMRS pattern book may be pre-defined in a 3GPP standard.

F. Example UE Embodiment

Figure 5:
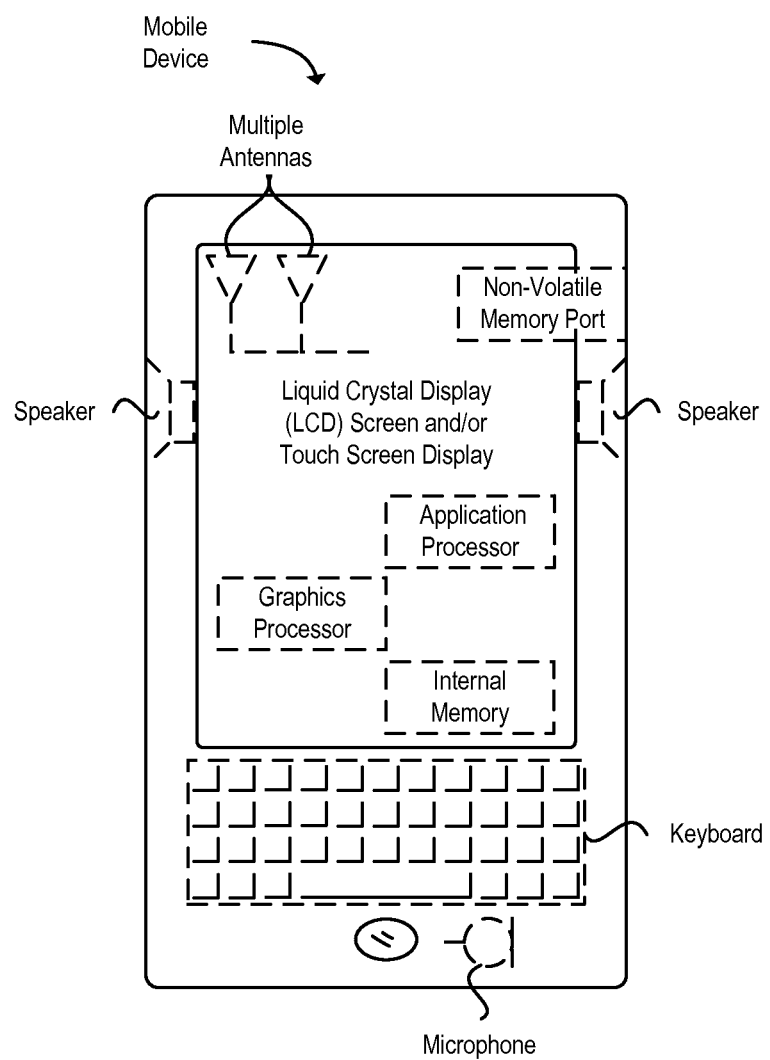
FIG. 5 is a block diagram of a UE, according to a mobile device embodiment.

FIG. 5 provides an example illustration of a mobile device, commonly deployed as a UE, and referred to as a mobile station (MS), a mobile wireless device, a mobile communication device, a tablet, a handset, or another type of mobile wireless device.

The mobile device includes a modem configured to communicate with a transmission station, such as a base station (BS), an eNB, a base band unit (BBU), a remote radio head (RRH), a remote radio equipment (RRE), a relay station (RS), a radio equipment (RE), or another type of wireless wide area network (WWAN) access point. The mobile device can be configured to communicate using at least one wireless communication standard, including 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 5 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

G. Other Example Embodiments

According to one embodiment of the present disclosure, a user equipment (UE) to design a demodulation reference signal (DMRS) pattern book defining a set of DMRS patterns associated with a downlink channel of a long term evolution (LTE) wireless network, comprises a receiver to receive a reference signal carried in a downlink subframe, the reference signal indicating wireless channel characteristics; and means for performing channel and noise variance estimation based on the wireless channel characteristics indicated by the received reference signal; obtaining estimates of multipath-time delay and Doppler spreads; deriving channel coherence time and coherence bandwidth based on the obtained estimates of multipath-time delay and Doppler spreads; and preparing a DMRS pattern book as a function of the noise variance estimation, the channel coherence time, and the coherence bandwidth.

In some embodiments, the aforementioned means is circuitry operatively coupled to the receiver, and configured to perform channel and noise variance estimation based on the wireless channel characteristics indicated by the received reference signal; obtain estimates of multipath-time delay and Doppler spreads; derive channel coherence time and coherence bandwidth based on the obtained estimates of multipath-time delay and Doppler spreads; and prepare a DMRS pattern book as a function of the noise variance estimation, the channel coherence time, and the coherence bandwidth.

There are some embodiments of the UE, in which the received reference signal comprises a cell-specific reference signal (CRS), and in which the channel and noise variance estimation is based on channel characteristics indicated by the CRS reference signal.

There are some embodiments of the UE, in which the received reference signal comprises a channel state information reference signal (CSI-RS), and the channel and noise variance estimation is based on channel characteristics indicated by the CSI-RS reference signal.

There are some embodiments of the UE, in which the wireless channel characteristics include frequency-selective fading channel characteristics having multiple bandwidth parts, each of different ones of the multiple bandwidth parts having a corresponding coherence time and coherence bandwidth, and the DMRS pattern book including DMRS patterns optimized for the different ones of the multiple bandwidth parts based on the corresponding coherence time and coherence bandwidth.

There are some embodiments of the UE, in which the DMRS pattern book includes a DMRS pattern that occurs once for each of multiple consecutive subframes.

There are some embodiments of the UE, in which the DMRS pattern book includes a DMRS pattern having a density of subcarriers that is based on a frequency domain variability of the wireless channel characteristics.

There are some embodiments of the UE, in which the DMRS pattern book is a frequency-dependent DMRS pattern book including DMRS patterns designed for the entire available bandwidth or a portion of the bandwidth.

There are some embodiments of the UE, in which the DMRS pattern book is a frequency-dependent DMRS pattern book including DMRS patterns designed for the entire available bandwidth or a portion of the bandwidth, and in which the frequency-dependent DMRS pattern book is associated with information identifying the portions of the bandwidth that correspond to different ones of the DMRS patterns.

According to another embodiment of the present disclosure, a user equipment (UE) configured to monitor a wireless communication channel and signal to an evolved node B (eNB) information defining a set of demodulation reference signal (DMRS) patterns, comprises a receiver configured to receive known signals from the eNB, the known signals being modified by transmission through the wireless communication channel from the eNB to the UE; a transmitter; and means for determining conditions of the wireless channel based on the received known signals; designing the set of DMRS patterns dynamically based on the conditions of the wireless communication channel; and causing the transmitter to transmit to the eNB the information defining the set of DMRS patterns.

In some embodiments of the UE, the aforementioned means is circuitry operatively coupled to the receiver and transmitter, and configured to determine conditions of the wireless channel based on the received known signals; design the set of DMRS patterns dynamically based on the conditions of the wireless communication channel; and cause the transmitter to transmit to the eNB the information defining the set of DMRS patterns.

There are some embodiments of the UE, in which the UE is configured to use radio resource control (RRC) signaling to signal to the eNB the information defining the set of DMRS patterns.

There are some embodiments of the UE, in which the UE is configured to use radio resource control (RRC) signaling to signal to the eNB the information defining the set of DMRS patterns, in which the RRC signaling provides a total number of DMRS patterns of the set of DMRS patterns.

There are some embodiments of the UE, in which the UE is configured to use radio resource control (RRC) signaling to signal to the eNB the information defining the set of DMRS patterns, in which the RRC signaling provides information defining whether a DMRS pattern of the set of DMRS patterns is to be repeated for multiple physical resource blocks.

There are some embodiments of the UE, in which the set of DMRS patterns identifies resource element (RE) indexes of a DMRS pattern in one or more associated physical resource blocks.

There are some embodiments of the UE, in which the transmitter is configured to use radio resource control (RRC) signaling to signal to the eNB the information defining the set of DMRS patterns, in which the information defining the set of DMRS patterns includes a periodicity of DMRS resource element (RE) locations in frequency or time domains.

There are some embodiments of the UE, in which the information defining the set of DMRS patterns includes a periodicity of DMRS resource element (RE) locations in frequency or time domains, and in which, in the frequency domain, the DMRS RE locations are allocated periodically among physical resource blocks.

There are some embodiments of the UE, in which the information defining the set of DMRS patterns includes a periodicity of DMRS resource element (RE) locations in frequency or time domains, and in which, for the time domain, the DMRS RE locations are allocated periodically among subframes.

According to another embodiment of the present disclosure, an evolved node b (eNB) configured to select, and transmit to a user equipment (UE), a demodulation reference signal (DMRS), comprises a receiver configured to wirelessly communicate with the UE and receive from it a UE-designed DMRS pattern book; a transmitter configured to transmit a DMRS during a physical downlink shared channel (PDSCH) transmission; and means for selecting between a DMRS pattern of the UE-designed DMRS pattern book and a pre-defined DMRS pattern, the pre-defined DMRS pattern being not defined by the UE and having been previously specified on the eNB and the UE; indicating the selected DMRS pattern to the UE; and causing the transmitter to transmit the DMRS during the PDSCH transmission.

In some embodiments of the eNB, the aforementioned means is circuitry configured to select between a DMRS pattern of the UE-designed DMRS pattern book and a pre-defined DMRS pattern, the pre-defined DMRS pattern being not defined by the UE and having been previously specified on the eNB and the UE; indicate the selected DMRS pattern to the UE; and cause the transmitter to transmit the DMRS during the PDSCH transmission.

There are some embodiments of the eNB, in which the eNB is configured to use radio resource control (RRC) signaling to inform the UE which DMRS pattern is to be used for the PDSCH transmission.

There are some embodiments of the eNB, in which the eNB indicates the selected DMRS pattern on a subframe basis for the PDSCH transmission.

There are some embodiments of the eNB, in which the eNB is further configured to provide downlink control information in a physical downlink control channel (PDCCH) transmission to indicate the selected DMRS pattern.

There are some embodiments of the eNB, in which the eNB is further configured to provide downlink control information in a physical downlink control channel (PDCCH) transmission to indicate the selected DMRS pattern, and in which the selected DMRS pattern has an associated index value, the associated index value being transmitted in the PDCCH transmission to indicate the selected DMRS pattern.

According to another embodiment of the present disclosures, a method, performed by a user equipment (UE), for designing a demodulation reference signal (DMRS) pattern book defining a set of DMRS patterns associated with a downlink channel of a long term evolution (LTE) wireless network, comprises receiving a reference signal carried in a downlink subframe, the reference signal indicating wireless channel characteristics; performing channel and noise variance estimation based on the wireless channel characteristics indicated by the reference signal; obtaining estimates of multipath-time delay and Doppler spreads; deriving channel coherence time and coherence bandwidth based on the obtained estimates of multipath-time delay and Doppler spreads; and preparing a DMRS pattern book as a function of the noise variance estimation, the channel coherence time, and the coherence bandwidth.

There are some embodiments of the method, in which the received reference signal comprises a cell-specific reference signal (CRS), and in which the channel and noise variance estimation is based on channel characteristics indicated by the CRS reference signal.

There are some embodiments of the method, in which the received reference signal comprises a channel state information reference signal (CSI-RS), and the channel and noise variance estimation is based on channel characteristics indicated by the CSI-RS reference signal.

There are some embodiments of the method, in which the wireless channel characteristics include frequency-selective fading channel characteristics having multiple bandwidth parts, each of different ones of the multiple bandwidth parts having a corresponding coherence time and coherence bandwidth, and the DMRS pattern book including DMRS patterns optimized for the different ones of the multiple bandwidth parts based on the corresponding coherence time and coherence bandwidth.

There are some embodiments of the method, in which the DMRS pattern book includes a DMRS pattern that occurs once for each of multiple consecutive subframes.

There are some embodiments of the method, in which the DMRS pattern book includes a DMRS pattern having a density of subcarriers that is based on a frequency domain variability of the wireless channel characteristics.

There are some embodiments of the method, in which the DMRS pattern book is a frequency-dependent DMRS pattern book including DMRS patterns designed for the entire available bandwidth or a portion of the bandwidth.

There are some embodiments of the method, in which the DMRS pattern book is a frequency-dependent DMRS pattern book including DMRS patterns designed for the entire available bandwidth or a portion of the bandwidth, and in which the frequency-dependent DMRS pattern book is associated with information identifying the portions of the bandwidth that correspond to different ones of the DMRS patterns.

According to another embodiment of the present disclosure, a computer-readable medium having stored thereon, computer-executable instructions executable by a user equipment (UE) to cause the UE to design a demodulation reference signal (DMRS) pattern book defining a set of DMRS patterns associated with a downlink channel of a long term evolution (LTE) wireless network by receiving a reference signal carried in a downlink subframe, the reference signal indicating wireless channel characteristics; performing channel and noise variance estimation based on the wireless channel characteristics indicated by the reference signal; obtaining estimates of multipath-time delay and Doppler spreads; deriving channel coherence time and coherence bandwidth based on the obtained estimates of multipath-time delay and Doppler spreads; and preparing a DMRS pattern book as a function of the noise variance estimation, the channel coherence time, and the coherence bandwidth.

There are some embodiments of the computer-readable medium, in which the received reference signal comprises a cell-specific reference signal (CRS), and in which the channel and noise variance estimation is based on channel characteristics indicated by the CRS reference signal.

There are some embodiments of the computer-readable medium, in which the received reference signal comprises a channel state information reference signal (CSI-RS), and the channel and noise variance estimation is based on channel characteristics indicated by the CSI-RS reference signal.

There are some embodiments of the computer-readable medium, in which the wireless channel characteristics include frequency-selective fading channel characteristics having multiple bandwidth parts, each of different ones of the multiple bandwidth parts having a corresponding coherence time and coherence bandwidth, and the DMRS pattern book including DMRS patterns optimized for the different ones of the multiple bandwidth parts based on the corresponding coherence time and coherence bandwidth.

There are some embodiments of the computer-readable medium, in which the DMRS pattern book includes a DMRS pattern that occurs once for each of multiple consecutive subframes.

There are some embodiments of the computer-readable medium, in which the DMRS pattern book includes a DMRS pattern having a density of subcarriers that is based on a frequency domain variability of the wireless channel characteristics.

There are some embodiments of the computer-readable medium, in which the DMRS pattern book is a frequency-dependent DMRS pattern book including DMRS patterns designed for the entire available bandwidth or a portion of the bandwidth.

There are some embodiments of the computer-readable medium, in which the DMRS pattern book is a frequency-dependent DMRS pattern book including DMRS patterns designed for the entire available bandwidth or a portion of the bandwidth, and in which the frequency-dependent DMRS pattern book is associated with information identifying the portions of the bandwidth that correspond to different ones of the DMRS patterns.

According to another embodiment of the present disclosure, a method, performed by a user equipment (UE), for monitoring a wireless communication channel and signaling to an evolved node B (eNB) information defining a set of demodulation reference signal (DMRS) patterns, comprises receiving known signals from the eNB, the known signals being modified by transmission through the wireless communication channel from the eNB to the UE; determining conditions of the wireless channel based on the received known signals; designing the set of DMRS patterns dynamically based on the conditions of the wireless communication channel; and transmitting to the eNB the information defining the set of DMRS patterns.

There are some embodiments of the method, in which the transmitting is configured to use radio resource control (RRC) signaling to signal to the eNB the information defining the set of DMRS patterns.

There are some embodiments of the method, in which the transmitting is configured to use radio resource control (RRC) signaling to signal to the eNB the information defining the set of DMRS patterns, in which the RRC signaling provides a total number of DMRS patterns of the set of DMRS patterns.

There are some embodiments of the method, in which the transmitting is configured to use radio resource control (RRC) signaling to signal to the eNB the information defining the set of DMRS patterns, in which the RRC signaling provides information defining whether a DMRS pattern of the set of DMRS patterns is to be repeated for multiple physical resource blocks.

There are some embodiments of the method, in which the set of DMRS patterns identifies resource element (RE) indexes of a DMRS pattern in one or more associated physical resource blocks.

There are some embodiments of the method, in which the transmitting is configured to use radio resource control (RRC) signaling to signal to the eNB the information defining the set of DMRS patterns, in which the information defining the set of DMRS patterns includes a periodicity of DMRS resource element (RE) locations in frequency or time domains.

There are some embodiments of the method, in which, in the frequency domain, the DMRS RE locations are allocated periodically among physical resource blocks.

There are some embodiments of the method, in which, for the time domain, the DMRS RE locations are allocated periodically among subframes.

According to another embodiment of the present disclosure, a computer-readable medium having stored thereon, computer-executable instructions executable by a user equipment (UE) to cause the UE to receive known signals from an evolved node B (eNB), the known signals being modified by transmission, through a wireless communication channel, from the eNB to the UE; determine conditions of the wireless channel based on the received known signals; design a set of demodulation reference signal (DMRS) patterns dynamically based on the conditions of the wireless communication channel; and transmit to the eNB information defining the set of DMRS patterns.

There are some embodiments of the computer-readable medium, in which the transmitting is configured to use radio resource control (RRC) signaling to signal to the eNB the information defining the set of DMRS patterns.

There are some embodiments of the computer-readable medium, in which the transmitting is configured to use radio resource control (RRC) signaling to signal to the eNB the information defining the set of DMRS patterns, in which the RRC signaling provides a total number of DMRS patterns of the set of DMRS patterns.

There are some embodiments of the computer-readable medium, in which the transmitting is configured to use radio resource control (RRC) signaling to signal to the eNB the information defining the set of DMRS patterns, in which the RRC signaling provides information defining whether a DMRS pattern of the set of DMRS patterns is to be repeated for multiple physical resource blocks.

There are some embodiments of the computer-readable medium, in which the set of DMRS patterns identifies resource element (RE) indexes of a DMRS pattern in one or more associated physical resource blocks.

There are some embodiments of the computer-readable medium, in which the transmitting is configured to use radio resource control (RRC) signaling to signal to the eNB the information defining the set of DMRS patterns, in which the information defining the set of DMRS patterns includes a periodicity of DMRS resource element (RE) locations in frequency or time domains.

There are some embodiments of the computer-readable medium, in which, in the frequency domain, the DMRS RE locations are allocated periodically among physical resource blocks.

There are some embodiments of the computer-readable medium, in which, for the time domain, the DMRS RE locations are allocated periodically among subframes.

According to another embodiment of the present disclosure, a method, performed by an evolved node b (eNB), to select, and transmit to a user equipment (UE), a demodulation reference signal (DMRS), comprises receiving from the UE a UE-designed DMRS pattern book; selecting between a DMRS pattern of the UE-designed DMRS pattern book and a pre-defined DMRS pattern, the pre-defined DMRS pattern being not defined by the UE and having been previously specified on the eNB and the UE; indicating the selected DMRS pattern to the UE; and transmitting the DMRS during a physical downlink shared channel (PDSCH) transmission.

There are some embodiments of the method, in which the eNB is configured to use radio resource control (RRC) signaling to inform the UE which DMRS pattern is to be used for the PDSCH transmission.

There are some embodiments of the method, in which the eNB indicates the selected DMRS pattern on a subframe basis for the PDSCH transmission.

There are some embodiments of the method, in which the eNB is further configured to provide downlink control information in a physical downlink control channel (PDCCH) transmission to indicate the selected DMRS pattern.

There are some embodiments of the method, in which the eNB is further configured to provide downlink control information in a physical downlink control channel (PDCCH) transmission to indicate the selected DMRS pattern, and in which the selected DMRS pattern has an associated index value, the associated index value being transmitted in the PDCCH transmission to indicate the selected DMRS pattern.

According to another embodiment of the present disclosure, a computer-readable medium having stored thereon, computer-executable instructions executable by evolved node b (eNB) to cause the eNB to receive from a user equipment (UE) a UE-designed DMRS pattern book; select between a DMRS pattern of the UE-designed DMRS pattern book and a pre-defined DMRS pattern, the pre-defined DMRS pattern being not defined by the UE and having been previously specified on the eNB and the UE; indicate the selected DMRS pattern to the UE; and transmit the DMRS during a physical downlink shared channel (PDSCH) transmission.

There are some embodiments of the computer-readable medium, in which the eNB is configured to use radio resource control (RRC) signaling to inform the UE which DMRS pattern is to be used for the PDSCH transmission.

There are some embodiments of the computer-readable medium, in which the eNB indicates the selected DMRS pattern on a subframe basis for the PDSCH transmission.

There are some embodiments of the computer-readable medium, in which the eNB is further configured to provide downlink control information in a physical downlink control channel (PDCCH) transmission to indicate the selected DMRS pattern.

There are some embodiments of the computer-readable medium, in which the eNB is further configured to provide downlink control information in a physical downlink control channel (PDCCH) transmission to indicate the selected DMRS pattern, and in which the selected DMRS pattern has an associated index value, the associated index value being transmitted in the PDCCH transmission to indicate the selected DMRS pattern.

The techniques introduced above can be implemented by programmable circuitry programmed or configured by software and/or firmware, or they can be implemented entirely by special-purpose hardwired circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Embodiments may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, one or more processors may be configured with instructions stored on a computer-readable storage device.

It will be understood by skilled persons that many changes may be made to the details of the above-described embodiments without departing from the underlying principles of the invention. The scope of the present invention should, therefore, be determined only by the following claims.

The invention claimed is:

1. A user equipment (UE) to design a demodulation reference signal (DMRS) pattern book defining a set of DMRS patterns associated with a downlink channel of a long term evolution (LTE) wireless network, the UE comprising:
a receiver to receive a reference signal carried in a downlink subframe, the reference signal indicating wireless channel characteristics; and
circuitry operatively coupled to the receiver, the circuitry configured to:
perform channel and noise variance estimation based on the wireless channel characteristics indicated by the received reference signal;
obtain estimates of multipath-time delay and Doppler spreads;
derive channel coherence time and coherence bandwidth based on the obtained estimates of multipath-time delay and Doppler spreads; and
prepare a DMRS pattern book as a function of the noise variance estimation, the channel coherence time, and the coherence bandwidth.

2. The UE of claim 1, in which the received reference signal comprises a cell-specific reference signal (CRS), and in which the circuitry is further configured to perform the channel and noise variance estimation based on channel characteristics indicated by the CRS reference signal.

3. The UE of claim 1, in which the received reference signal comprises a channel state information reference signal (CSI-RS), and in which the circuitry is further configured to perform the channel and noise variance estimation based on channel characteristics indicated by the CSI-RS reference signal.

4. The UE of claim 1, in which the wireless channel characteristics include frequency-selective fading channel characteristics having multiple bandwidth parts, each of different ones of the multiple bandwidth parts having a corresponding coherence time and coherence bandwidth, and the DMRS pattern book including DMRS patterns optimized for the different ones of the multiple bandwidth parts based on the corresponding coherence time and coherence bandwidth.

5. The UE of claim 1, in which the DMRS pattern book includes a DMRS pattern that occurs once for each of multiple consecutive subframes.

6. The UE of claim 1, in which the DMRS pattern book includes a DMRS pattern having a density of subcarriers that is based on a frequency domain variability of the wireless channel characteristics.

7. The UE of claim 1, in which the DMRS pattern book is a frequency-dependent DMRS pattern book including DMRS patterns designed for the entire available bandwidth or a portion of the bandwidth.

8. The UE of claim 7, in which the frequency-dependent DMRS pattern book is associated with information identifying the portions of the bandwidth that correspond to different ones of the DMRS patterns.

9. A user equipment (UE) configured to monitor a wireless communication channel and signal to an evolved node B (eNB) information defining a set of demodulation reference signal (DMRS) patterns, the UE comprising:
a receiver configured to receive known signals from the eNB, the known signals being modified by transmission through the wireless communication channel from the eNB to the UE;
a transmitter; and
circuitry operationally coupled to the receiver and transmitter, the circuitry configured to:
determine conditions of the wireless channel based on the received known signals;
design the set of DMRS patterns dynamically based on the conditions of the wireless communication channel; and
cause the transmitter to transmit to the eNB the information defining the set of DMRS patterns, wherein radio resource control (RRC) signaling is used to signal to the eNB the information defining the set of DMRS patterns, and wherein the RRC signaling provides information defining whether a DMRS pattern of the set of DMRS patterns is to be repeated for multiple physical resource blocks.

10. The UE of claim 9, in which the RRC signaling provides a total number of DMRS patterns of the set of DMRS patterns.

11. The UE of claim 9, in which the set of DMRS patterns identifies resource element (RE) indexes of a DMRS pattern in one or more associated physical resource blocks.

12. The UE of claim 9, in which the information defining the set of DMRS patterns includes a periodicity of DMRS resource element (RE) locations in frequency or time domains.

13. The UE of claim 12, in which, in the frequency domain, the DMRS RE locations are allocated periodically among physical resource blocks.

14. The UE of claim 12, in which, for the time domain, the DMRS RE locations are allocated periodically among subframes.

15. An evolved node b (eNB) configured to select, and transmit to a user equipment (UE), a demodulation reference signal (DMRS), the eNB comprising:
    a receiver configured to wirelessly communicate with the UE and receive from it a UE-designed DMRS pattern book;
    a transmitter configured to transmit a DMRS during a physical downlink shared channel (PDSCH) transmission; and
    circuitry configured to:
        select between a DMRS pattern of the UE-designed DMRS pattern book and a pre-defined DMRS pattern, the pre-defined DMRS pattern being not defined by the UE and having been previously specified on the eNB and the UE;
        indicate the selected DMRS pattern to the UE; and
        cause the transmitter to transmit the DMRS during the PDSCH transmission.

16. The eNB of claim 15, in which the circuitry is further configured to use radio resource control (RRC) signaling to inform the UE which DMRS pattern is to be used for the PDSCH transmission.

17. The eNB of claim 15, in which the circuitry indicates the selected DMRS pattern on a subframe basis for the PDSCH transmission.

18. The eNB of claim 15, in which the circuitry is further configured to provide downlink control information in a physical downlink control channel (PDCCH) transmission to indicate the selected DMRS pattern.

19. The eNB of claim 18, in which the selected DMRS pattern has an associated index value, the associated index value being transmitted in the PDCCH transmission to indicate the selected DMRS pattern.

20. A user equipment (UE) configured to monitor a wireless communication channel and signal to an evolved node B (eNB) information defining a set of demodulation reference signal (DMRS) patterns, the UE comprising:
    a receiver configured to receive known signals from the eNB, the known signals being modified by transmission through the wireless communication channel from the eNB to the UE;
    a transmitter; and
    circuitry operationally coupled to the receiver and transmitter, the circuitry configured to:
    determine conditions of the wireless channel based on the received known signals;
    design the set of DMRS patterns dynamically based on the conditions of the wireless communication channel; and
    cause the transmitter to transmit to the eNB the information defining the set of DMRS patterns, wherein the information defining the set of DMRS patterns includes a periodicity of DMRS resource element (RE) locations in frequency or time domains.

21. The UE of claim 20, in which the circuitry is further configured to use radio resource control (RRC) signaling to signal to the eNB the information defining the set of DMRS patterns.

22. The UE of claim 21, in which the RRC signaling provides a total number of DMRS patterns of the set of DMRS patterns.

23. The UE of claim 21, in which the RRC signaling provides information defining whether a DMRS pattern of the set of DMRS patterns is to be repeated for multiple physical resource blocks.

24. The UE of claim 20, in which the set of DMRS patterns identifies resource element (RE) indexes of a DMRS pattern in one or more associated physical resource blocks.

25. The UE of claim 20, in which, in the frequency domain, the DMRS RE locations are allocated periodically among physical resource blocks.

26. The UE of claim 20, in which, for the time domain, the DMRS RE locations are allocated periodically among subframes.

* * * * *